No. 676,209. Patented June 11, 1901.
H. STRACHE.
PROCESS OF PURIFYING WATER GAS.
(Application filed May 19, 1900.)
(No Model.)
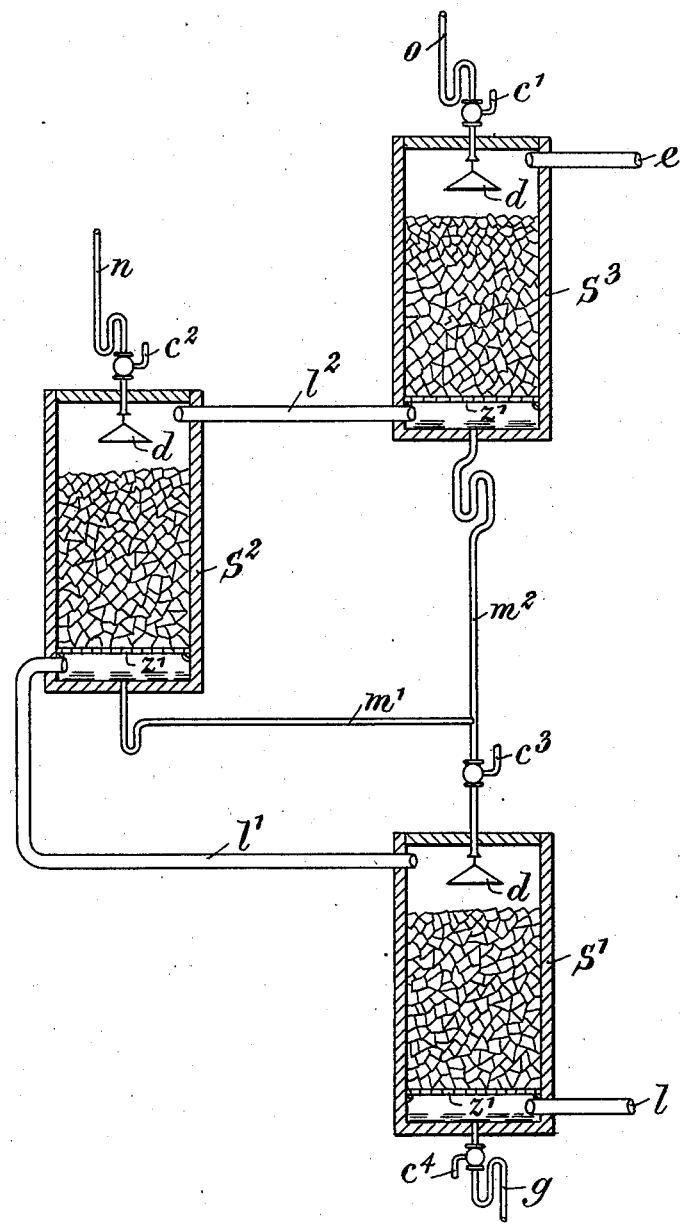
Witnesses:
Jno. A. Paulson
E. E. Nelson
Hugo Strache Inventor
by Schreiter & Mathews his Attorneys

UNITED STATES PATENT OFFICE.

HUGO STRACHE, OF VIENNA, AUSTRIA-HUNGARY.

PROCESS OF PURIFYING WATER-GAS.

SPECIFICATION forming part of Letters Patent No. 676,209, dated June 11, 1901.

Original application filed February 20, 1896, Serial No. 579,954. Divided and this application filed May 19, 1900. Serial No. 17,233. (No specimens.)

*To all whom it may concern:*

Be it known that I, HUGO STRACHE, Ph. D., of Vienna, Province of Lower Austria, in the Empire of Austria-Hungary, have invented certain new and useful Improvements in the Manufacture of Water-Gas, of which the following is a full, clear, and exact description, reference being had to the apparatus described in my application for United States Letters Patent filed February 20, 1896, Serial No. 579,954, of which this is a subdivisional application.

The accompanying drawing, representing a diagram of the arrangement and connection of scrubbers for purifying the gas, is the same as Fig. 2 of the drawings annexed to my afore-recited application.

My invention relates to a process for the manufacture of illuminating and fuel gas; and it consists of the herein-described process for purifying the water-gas made of fresh anthracite or bituminous coal, coke, or other carbonaceous substances and for eliminating therefrom all impurities before the same is admitted into conduits.

The water-gas produced in my improved apparatus set forth in my afore-recited application for Letters Patent of the United States, Serial No. 579,954, filed February 20, 1896, is, like other gases produced by distillation, not pure. Besides iron carbonyl and carbonic oxid and carbonic dioxid it contains also hydric sulfid, which may be eliminated by nitric acid; and the object of my invention is to devise a process whereby the action of the nitric acid in purifying the gas is more fully utilized and the necessity of using large quantities of this acid, as required in the processes heretofore known, is obviated. In my improved process one quantity of nitric acid is used continuously until fully consumed, and though the elimination of hydric sulfid from the gas by means of my improved process is not as complete as it could be made if the nitric acid would not be used over again, this process is fully adequate and suitable for practical use. It is based on the discovery that $N_2O_4$ dissolves in water, forming nitric acid ($HNO_3$) and nitrous acid, ($HNO_2$,) and, further, that the nitrous acid when in an aqueous solution separates easily into nitric acid and nitric oxid, and, finally, that nitric acid when in diluted solution precipitates sulfur from hydric sulfid, forming nitrous acid. This process is carried on in the apparatus illustrated diagrammatically in the drawing.

The purifying apparatus consists of a battery of closed vessels. The first of these is similar to those commonly used for washing coal-gas and known under the name "scrubber." It is, however, filled with sulfuric acid in place of water. The generated water-gas is passed through this vessel to eliminate therefrom all iron carbonyl. Connecting with the outlet-pipe $l$ of this scrubber and some distance therefrom is arranged the apparatus shown diagrammatically in the drawing. This apparatus comprises three closed vessels $S'$, $S^2$, and $S^3$, arranged successively one above the other. These vessels are made of acid-proof material and are provided with double bottoms, the inner (designated $z$ in the drawing) being perforated. Vessel $S^2$ is connected by pipe $n$ to a tank (not shown in the drawing) containing concentrated nitric acid, and vessel $S^3$ is connected by pipe $o$ to a water-tank. The gas enters vessel $S'$ through pipe $l$, connecting this vessel, which is, as explained above, connected with the outlet-pipe of the first purifying apparatus. Vessels $S'$ and $S^2$ are connected by a gas-conduit $l'$ and vessels $S^2$ and $S^3$ by gas-conduits $l^2$ in such manner that always the upper end of the preceding connects with the lower end of the next following vessel. About two-thirds of the space of each vessel above the perforated bottoms is filled with broken pieces of glass, burnt clay, pumice-stone, or some other acid-proof material to produce a very large contact-surface between the upwardly-flowing gas and the dripping liquids through the scrubbers. Scrubbers $S^2$ and $S^3$ are connected to the top of the vessel $S'$ by pipes $m'$ and $m^2$, conveying the liquids accumulating on the bottoms of vessels $S^2$ and $S^3$ into vessel $S'$, where they are utilized, as will be explained hereinafter, before being discharged through outlet-pipe $g$. All liquid-conduits are provided with drips $d$, traps, and cocks $c'$, $c^2$, $c^3$, and $c^4$, respectively, for regulating the flow of the liquids into and out of the vessels. The quantity of water used in this purifying process in proportion to the quantity of concentrated nitric acid is approximately in the proportion of fifty to one—that is, fifty parts of water are used for each part of concentrated nitric acid. This proportion, however, is not an absolute or invariable rule and is governed to a certain degree by the kind and quality of raw material used. The gas entering vessel S' through pipe $l$ passes successively through this vessel, conduit $l'$, vessel $S^2$, and conduit $l^2$ into vessel $S^3$ and is from there purified through pipe $e$ into an odorizing apparatus.

The process of purifying the water-gas is carried on as follows: The raw gas containing hydric sulfid passes through pipe $l$ into vessel S', wherein it meets an aqueous solution composed of sulfuric, nitrous, and nitric acids, the sulfuric acid resulting from the oxidation of hydric sulfid contained in the gas and the nitrous acid from the reduction of nitric acid. The nitrous acid separates here into nitric acid and nitric oxid, the latter passing, with the gas, into vessels $S^2$ and $S^3$. Thus the main component of what is retained in vessel S' is nitric acid, and, besides this, sulfuric acid, and there may remain also a small percentage of nitrous acid. The nitric acid eliminates from the gas passing through the vessel the greatest part of the hydric sulfid, separating it by precipitating the sulfur. The gas passing through pipe $l'$ into vessel $S^2$ will contain only a very little of hydric sulfid, and consequently when subjected to the action of concentrated nitric acid flowing constantly into this scrubber through the pipe $n$ and dripping over the material filled therein only a small quantity of sulfuric acid will be produced by splitting the hydric sulfid. From vessel $S^2$ the gas passes through pipe $l^2$ into vessel $S^3$, where it comes into contact with the water. This eliminates from it all tetroxid of nitrogen by transforming it into nitric and nitrous acids discharged in aqueous solution through pipe $m^2$ and conveyed into vessels S', together with the nitrous acid flowing from vessel $S^2$ through pipe $m'$. When this aqueous solution reaches vessel S', the nitrous acid splits instantly into nitrous acid and nitric oxid, the latter escaping again into vessel $S^2$ (and $S^3$) with the water-gas. These reactions are repeated until the nitric acid is consumed, being successively and almost fully transformed into nitric-oxid gas. Only a very small quantity of nitric and sulfuric acids escapes through pipe $g$ from the first vessel S' of the apparatus. The final result of these reactions shows that in this process only one hundred and twenty-six parts of nitric acid are required to absorb and dissolve one hundred and two parts of hydric sulfid into sulfid and nitric oxid, which proves that this is a much better and more economical process than the one using concentrated nitric acid alone. It must, however, be remembered that the purified gas does contain some nitric oxid. This can be eliminated (absorbed) by water if a sufficient quantity of air or oxygen is added to the gas. The addition of air or oxygen to the gas may be made before the same enters the scrubber S', and this is preferable because then also the nitrous acid produced there will constantly be reformed into nitric acid.

In this process the nitrous and nitric acids act alternately as keepers of the oxygen, and the result is that only a small quantity of oxygen is sufficient to separate a very large quantity (theoretically an unlimited quantity) of hydric sulfid by precipitating the sulfur.

The quantity of air to be added to the gas can be calculated so closely that no nitric-oxid gas will escape with the hydrogen gas, all being transformed in trioxid of nitrogen and nitric acid, respectively, and conveyed through pipe $l^2$ back into vessel S'. Then only the quantity of nitric acid absorbed in the process of forming the sulfuric acid is consumed, and in addition to this a very small quantity of nitrous acid escaping through pipe $g$ is lost.

The sulfur precipitated in vessel S' accumulates on the material, filling the scrubber and can be recovered by drying the sediment and melting it. That part of the sulfur that escapes through pipe $g$ accumulates as a porous sediment on the bottom of a tank and can be gathered directly.

The hydric sulfid should be eliminated from the sulfuric gas also in an apparatus wherein one part of the gas coming from the generator is passed through a scrubber containing concentrated nitric acid and by mixing then the oxids of nitrogen developed thereby with the other part of the generator-gas. A quantity of air or oxygen may or may not be added to it. This purifying process would, however, be neither as rapid as the process whereby the generated gas is passed through concentrated nitric acid nor as absolute.

I claim as my invention—

1. The process of purifying water-gas containing hydric sulfid, which consists in subjecting the gas successively; first to the action of an aqueous solution of nitrous and nitric acids, second, to the action of concentrated nitric acid, and third, to the action of water, whereby the hydric sulfid, contained in the gas, and the nitric oxid produced in the purifying process are eliminated.

2. The process of purifying water-gas containing hydric sulfid, which consists in adding to the gas a proportionate quantity of atmospheric air and then subjecting the mixture successively, first, to the action of an aqueous solution of nitrous and nitric acids, second, to the action of concentrated nitric acid and third to the action of water, whereby the hydric sulfid, contained in the gas, and the nitric oxid produced in the purifying process are fully eliminated.

HUGO STRACHE.

Witnesses:
WALTER MIDDELDORF,
SIEGMUND KUTEDERO.